US012641282B2

(12) United States Patent
Lee

(10) Patent No.: US 12,641,282 B2
(45) Date of Patent: *May 26, 2026

(54) METHOD FOR REFINING A MOTION VECTOR DERIVED UNDER A MERGE MODE USING A DIFFERENCE VECTOR

(71) Applicant: KT CORPORATION, Gyeonggi-do (KR)

(72) Inventor: Bae Keun Lee, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/904,983

(22) Filed: Oct. 2, 2024

(65) Prior Publication Data

US 2025/0030886 A1    Jan. 23, 2025

Related U.S. Application Data

(63) Continuation of application No. 17/893,421, filed on Aug. 23, 2022, now Pat. No. 12,137,243, which is a
(Continued)

(30) Foreign Application Priority Data

Aug. 29, 2017    (KR) ........................ 10-2017-0109639

(51) Int. Cl.
*H04N 19/159* (2014.01)
*H04N 19/176* (2014.01)
(Continued)

(52) U.S. Cl.
CPC ......... *H04N 19/577* (2014.11); *H04N 19/159* (2014.11); *H04N 19/176* (2014.11); *H04N 19/52* (2014.11); *H04N 19/56* (2014.11)

(58) Field of Classification Search
CPC .......................... H04N 19/577; H04N 19/159
(Continued)

(56) References Cited

U.S. PATENT DOCUMENTS 10,764,598 B2    9/2020   Seo et al.
2006/0285594 A1   12/2006   Kim et al.
(Continued)

FOREIGN PATENT DOCUMENTS

CN        102017638 A    4/2011
CN        104350753 A    2/2015
(Continued)

OTHER PUBLICATIONS

C. Rosewarne et al., "High Efficiency Video Coding (HEVC) Test Model 16 (HM 16) Improved Encoder Description Update 9", Document: JCTVC-AB1002, Joint Collaborative Team on Video Coding (JCT-VC) of ITU-T SG16 WP3 and ISO/IEC JTC1/SC29/WG11, 28th Meeting: Torino, IT, Jul. 15-21, 2017.
(Continued)

*Primary Examiner* — Amir Shahnami
(74) *Attorney, Agent, or Firm* — IP Legal Services, LLC

(57) ABSTRACT

An image decoding method according to the present invention comprises: a step of acquiring an initial motion vector of a current block; a step of deriving a refined motion vector for each of a plurality of search points on the basis of the initial motion vector; and a step of acquiring a motion vector of the current block on the basis of the refined motion vector of any one of the plurality of search points.

5 Claims, 13 Drawing Sheets

Related U.S. Application Data continuation of application No. 16/619,231, filed as application No. PCT/KR2018/009869 on Aug. 27, 2018, now Pat. No. 11,457,235.

(51) Int. Cl.
*H04N 19/52* (2014.01)
*H04N 19/56* (2014.01)
*H04N 19/577* (2014.01)

(58) Field of Classification Search
USPC .................................................... 375/240.15
See application file for complete search history.

(56) References Cited

U.S. PATENT DOCUMENTS

| | | | |
|---|---|---|---|
| 2011/0032995 A1 | 2/2011 | Chua et al. | |
| 2014/0205013 A1 | 7/2014 | Kim et al. | |
| 2014/0314143 A1 | 10/2014 | Lee et al. | |
| 2015/0110199 A1 | 4/2015 | Ikai et al. | |
| 2015/0146775 A1 | 5/2015 | Lee et al. | |
| 2016/0156910 A1 | 6/2016 | Lee et al. | |
| 2016/0286232 A1 | 9/2016 | Li et al. | |
| 2016/0316208 A1 | 10/2016 | Lee et al. | |
| 2016/0316209 A1 | 10/2016 | Lee et al. | |
| 2017/0078702 A1 | 3/2017 | Ikai et al. | |
| 2017/0208330 A1 | 7/2017 | Ikai et al. | |
| 2017/0208341 A1 | 7/2017 | Kulakov et al. | |
| 2017/0302934 A1 | 10/2017 | Ikai et al. | |
| 2018/0041769 A1 | 2/2018 | Chuang et al. | |
| 2018/0070090 A1 | 3/2018 | Lee et al. | |
| 2018/0249154 A1 | 8/2018 | Chuang et al. | |
| 2018/0270508 A1 | 9/2018 | Lim et al. | |
| 2018/0278949 A1* | 9/2018 | Karczewicz | H04N 19/513 |
| 2019/0082192 A1 | 3/2019 | Chuang et al. | |
| 2019/0208223 A1 | 7/2019 | Galpin et al. | |
| 2020/0045317 A1 | 2/2020 | Ikai et al. | |
| 2020/0077088 A1 | 3/2020 | Chuang et al. | |
| 2020/0137414 A1 | 4/2020 | Esenlik et al. | |
| 2020/0137415 A1 | 4/2020 | Esenlik et al. | |
| 2021/0044802 A1 | 2/2021 | Ikai et al. | |
| 2021/0243461 A1 | 8/2021 | Park et al. | |
| 2022/0408092 A1 | 12/2022 | Ikai et al. | |
| 2023/0362381 A1 | 11/2023 | Ikai et al. | |

FOREIGN PATENT DOCUMENTS

| | | |
|---|---|---|
| CN | 104378638 A | 2/2015 |
| CN | 105959699 A | 9/2016 |
| JP | 2006-101239 A | 4/2006 |
| KR | 10-2006-0106953 A | 10/2006 |
| KR | 10-2013-0002242 A | 1/2013 |
| WO | 02/37859 A2 | 5/2002 |
| WO | 2017/036414 A1 | 3/2017 |
| WO | 2017/043730 A1 | 3/2017 |

OTHER PUBLICATIONS

China National Intellectual Property Administration, Office Action of corresponding CN Patent Application No. 201880035954.2, Nov. 3, 2022.

C. Rosewarne et al., "High Efficiency Video Coding (HEVC) Test Model 16 (HM 16) Improved Encoder Description Update 8", Document: JCTVC-AA1002, Joint Collaborative Team on Video Coding (JCT-VC) of ITU-T SG16 WP3 and ISO/IEC JTC1/SC29/WG11, 27th Meeting: Hobart, AU, Mar. 31-Apr. 7, 2017.

China National Intellectual Property Administration, Notice of Allowance of corresponding CN Patent Application No. 201880035954.2, Sep. 28, 2023.

* cited by examiner

PART_2Nx2N    PART_Nx2N    PART_2NxN    PART_NxN

PART_nLx2N    PART_nRx2N    PART_2NxnU    PART_2NxnD

Determining motion information of current block — S810

Performing motion compensation for current block — S820

Performing overlapped motion compensation for current block — S830

Deriving spatial merge candidate of current block —— S910

Deriving temporal merge candidate of current block —— S920

Generating merge candidate list —— S930

Specifying merge candidate based on merge index —— S940

Determining motion information of current block based on motion information of merge candidate —— S950

FIG. 13

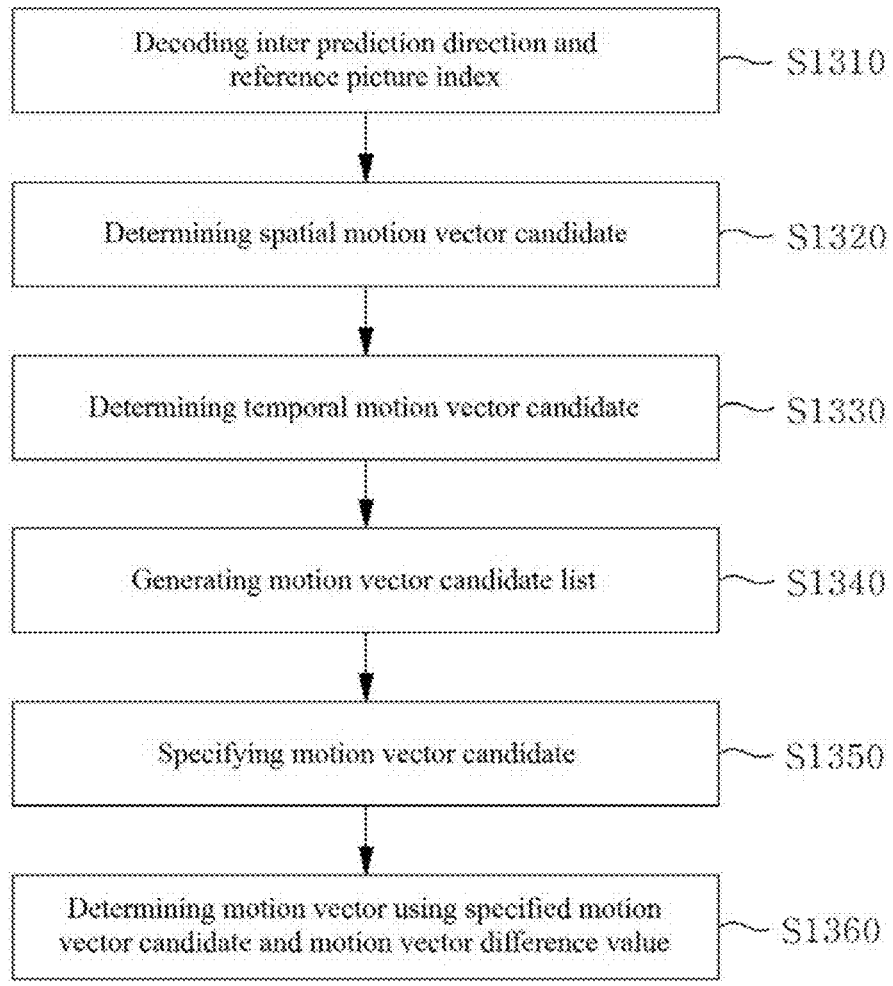

Decoding inter prediction direction and reference picture index ~ S1310

Determining spatial motion vector candidate ~ S1320

Determining temporal motion vector candidate ~ S1330

Generating motion vector candidate list ~ S1340

Specifying motion vector candidate ~ S1350

Determining motion vector using specified motion vector candidate and motion vector difference value ~ S1360

METHOD FOR REFINING A MOTION VECTOR DERIVED UNDER A MERGE MODE USING A DIFFERENCE VECTOR

CROSS REFERENCE TO RELATED APPLICATIONS

This application is a Continuation of U.S. patent application Ser. No. 17/893,421 (filed on Aug. 23, 2022), which is a Continuation of U.S. patent application Ser. No. 16/619,231 (filed on Dec. 4, 2019), now issued as U.S. Pat. No. 11,457,235, which is a National Stage Patent Application of PCT International Patent Application No. PCT/KR2018/009869 (filed on Aug. 27, 2018) under 35 U.S.C. § 371, which claims priority to Korean Patent Application No. 10-2017-0109639 (filed on Aug. 29, 2017), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have increased. A video compression technique for effectively providing stereographic image content with high resolution and ultra-high is resolution being discussed.

DISCLOSURE

Technical Problem

An object of the present invention is to provide a method and an apparatus for performing an efficient inter prediction for an encoding/decoding target block in encoding/decoding video signal.

An object of the present invention is to provide a method and an apparatus for updating motion information of a current block in encoding/decoding video signal.

An object of the present invention is to provide a method and an apparatus for variably determining search points used for updating motion information of a current block in encoding/decoding video signal.

The technical objects to be achieved by the present invention are not limited to the above-mentioned technical problems, and other technical problems that are not mentioned will be apparently understood to those skilled in the art from the following description.

Technical Solution

A method and an apparatus for decoding a video signal according to the present invention may comprise obtaining an initial motion vector of a current block, deriving a refined motion vector of each of a plurality of search points based on the initial motion vector, and obtaining a motion vector of the current block based on a refined motion vector of one of the plurality of search points.

A method and an apparatus for encoding a video signal according to the present invention may comprise obtaining an initial motion vector of a current block, deriving a refined motion vector of each of a plurality of search points based on the initial motion vector, and obtaining a motion vector of the current block based on a refined motion vector of one of the plurality of search points.

For a method and an apparatus for encoding/decoding a video signal according to the present invention, the initial motion vector may be obtained based on a merge candidate or a motion vector candidate of the current block.

For a method and an apparatus for encoding/decoding a video signal according to the present invention, the method and the apparatus may further comprise selecting a refinement mode of the current block, and the refinement mode may include at least one of bi-lateral matching or template matching.

For a method and an apparatus for encoding/decoding a video signal according to the present invention, the refinement mode may be determined based on whether a prediction direction of the current block is bidirectional.

For a method and an apparatus for encoding/decoding a video signal according to the present invention, when the refinement mode is bi-lateral matching, a cost of the search point may be calculated by comparing a first prediction block obtained based on the initial motion vector with a second prediction block obtained based on the refined motion vector.

For a method and an apparatus for encoding/decoding a video signal according to the present invention, when the refinement mode is template matching, a cost of the search point may be calculated by comparing a template neighboring the current block with a template neighboring a reference block specified by the refined motion vector.

For a method and an apparatus for encoding/decoding a video signal according to the present invention, the method and the apparatus may further comprise determining a search pattern of the current block, and at least one of a number of search points, positions of the search points, or a search order among the plurality of search points may be determined by the determined search pattern.

For a method and an apparatus for encoding/decoding a video signal according to the present invention, the search pattern of the current block may be determined based on at least one of a size, a shape, an inter prediction mode, or a refinement mode of the current block.

The features briefly summarized above for the present invention are only illustrative aspects of the detailed description of the invention that follows, but do not limit the scope of the invention.

Advantageous Effects

According to the present invention, an inter prediction for an encoding/decoding target block is performed efficiently.

According to the present invention, inter prediction efficiency is improved by updating motion information of a current block.

According to the present invention, inter prediction efficiency is improved by variably determining search pattern.

The effects obtainable by the present invention are not limited to the above-mentioned effects, and other effects not mentioned can be clearly understood by those skilled in the art from the description below.

DESCRIPTION OF DRAWINGS

FIG. 13 is a diagram illustrating a procedure of deriving motion information of a current block when an AMVP mode is applied to the current block.

MODE FOR INVENTION

Figure 1:
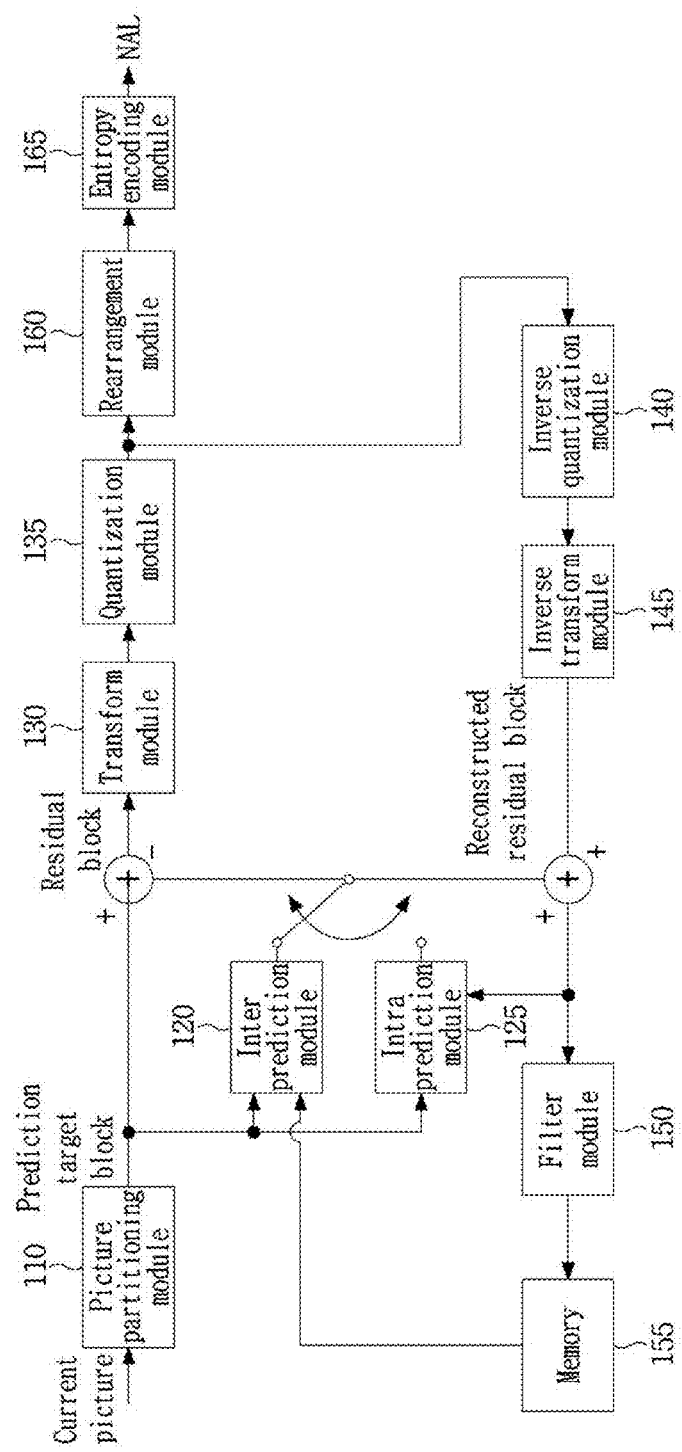
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

In the present disclosure, when an element is referred to as being "connected" or "coupled" to another element, it is understood to include not only that the element is directly connected or coupled to that another element but also that there may be another element therebetween. When an element is referred to as being "directly connected" or "directly coupled" to another element, it is understood that there is no other element therebetween.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP method (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit motion vector information, information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
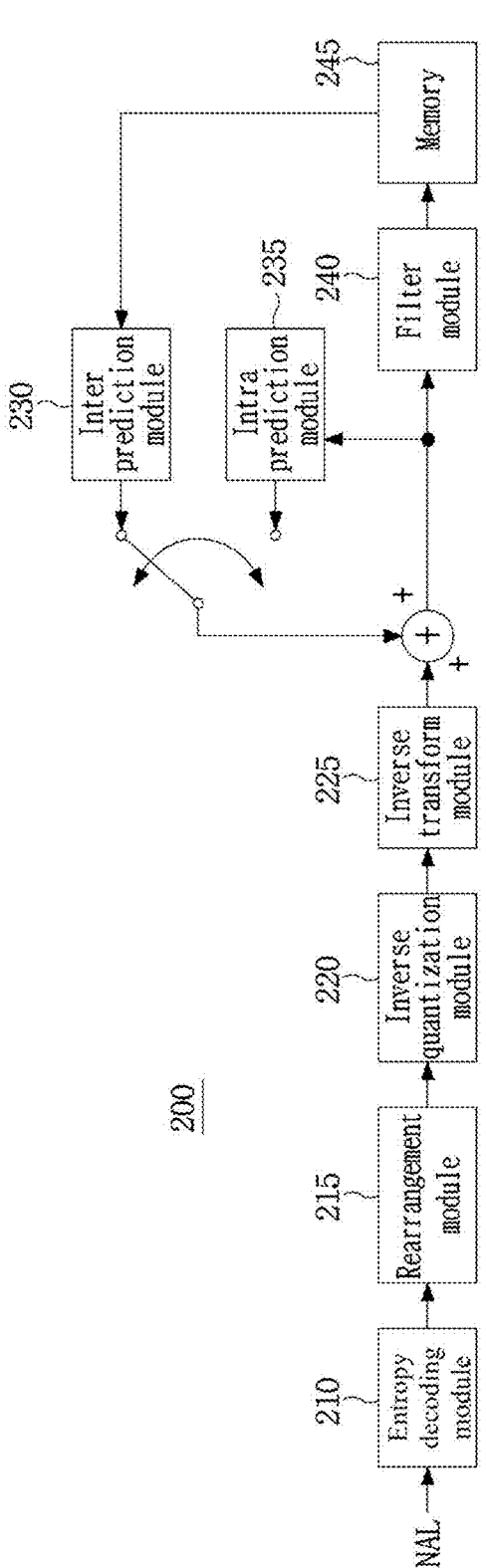
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit AIS and filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step.

A picture may be encoded/decoded by being divided into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit or a prediction unit, which is unit a base for performing prediction, quantization, transform or in-loop filtering and the like.

Partitioning of a coding tree unit or a coding unit may be performed based on at least one of a vertical line or a horizontal line. In addition, the number of vertical lines or horizontal lines partitioning a coding tree unit or a coding unit may be at least one. For example, by using one vertical line or one horizontal line, a coding tree unit or a coding unit may be partitioned into two partitions, or by using two vertical lines or two horizontal lines, a coding tree unit or a coding unit may be partitioned into three partitions. Alternatively, by using one vertical line and one horizontal line, a coding tree unit or a coding unit may be partitioned into four partitions having a length and width of ½.

When a coding tree unit or a coding unit is partitioned into a plurality of partitions using at least one vertical line or at least one horizontal line, the partitions may have a uniform size or may have different sizes. Alternatively, a partition may have a different size than the other partition.

In the embodiments described below, it is assumed that a coding tree unit or a coding unit is partitioned into a quad tree, triple tree, or binary tree structure. However, a coding tree unit or a coding unit may be partitioned using more vertical lines or more horizontal lines.

Figure 3:
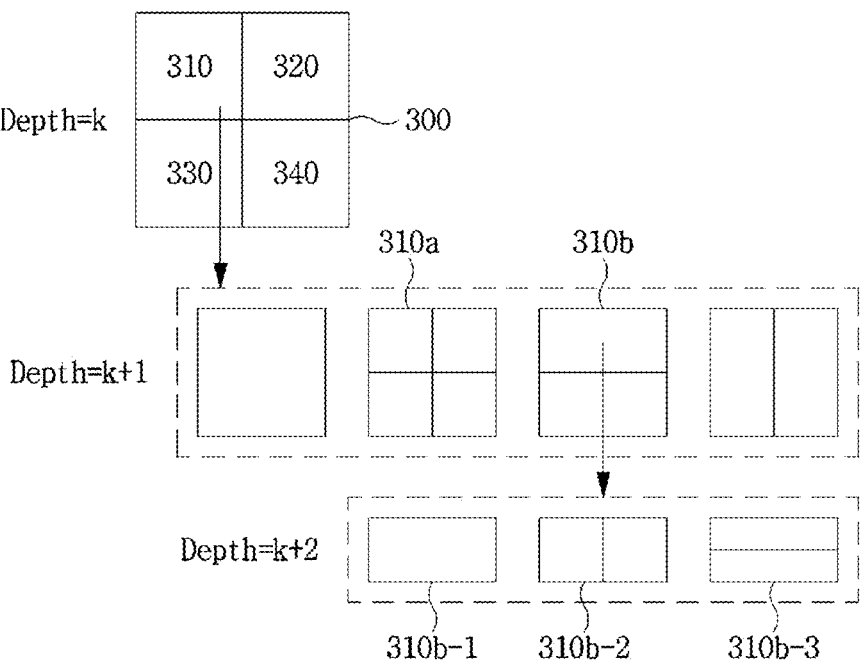
FIG. 3 is a diagram illustrating an example of hierarchically partitioning a coding block based on a tree structure as an embodiment to which the present invention is applied.

FIG. 3 is a diagram illustrating an example of hierarchically partitioning a coding block based on a tree structure as an embodiment to which the present invention is applied.

The input video signal is decoded in a unit of a predetermined block, and the base unit for decoding the input video signal is referred to as a coding block. The coding block intra/inter prediction, may be a for unit performing transformation, quantization. In addition, a prediction mode (e.g., intra prediction mode or inter prediction mode) may be determined in a unit of a coding block, and prediction blocks included in the coding block may share the determined prediction mode. A coding block may be a square or non-square block with any size in the range 8×8 to 64×64, and may be a square or non-square block with a size of 128×128, 256×256 or more.

Specifically, a coding block may be hierarchically partitioned based on at least one of a quad tree, a triple tree, and a binary tree. Here, quad tree-based partitioning may correspond to a method in which a 2N×2N coding block is partitioned into four N×N coding blocks, triple tree-based partitioning may correspond to a method in which one coding block is partitioned into three coding blocks, and binary tree-based partitioning may correspond to a method in which one coding block is partitioned into two coding blocks. Even when triple tree-based or binary tree-based partitioning is performed, a square coding block may exist at a lower depth. Alternatively, after triple tree-based or binary tree-based partitioning is performed, generating a square coding block may be limited at a lower depth.

Figure 4:
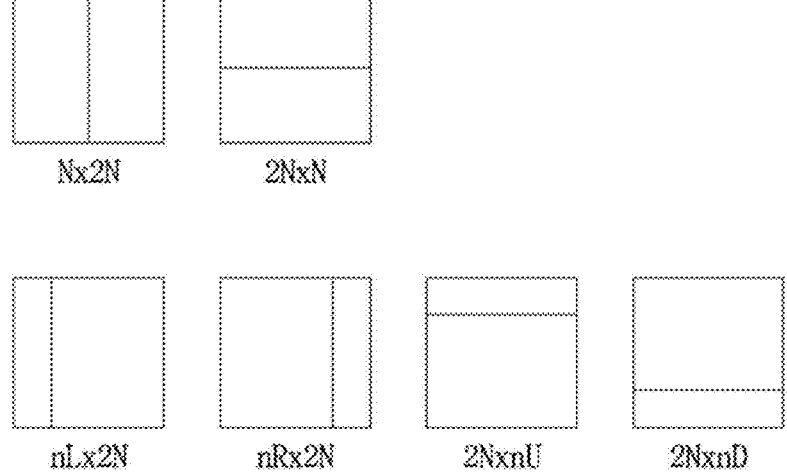
FIG. 4 is a diagram illustrating a partition type in which a binary tree-based partitioning is allowed as an embodiment to which the present invention is applied.

Binary tree-based partitioning may be performed symmetrically or asymmetrically. A coding block partitioned based on a binary tree may be a square block or a non-square block such as a rectangle. For example, a partition type that allows binary tree-based partitioning may include at least one of 2N×N (horizontal non-square coding unit) or N×2N (vertical non-square coding unit) which are examples of symmetric, nL×2N, nR×2N, 2N×nU or 2N×nD which are examples of asymmetric, as in the example shown in FIG. 4.

Binary tree-based partitioning may limitedly allow either symmetric partition or asymmetric partition. In this case, configuring a coding tree unit as a square block may correspond to quad tree CU partitioning, and configuring a coding tree unit as a symmetric non-square block may correspond to binary tree partitioning. Configuring a coding tree unit into a square block and a symmetric non-square block may correspond to quad and binary tree CU partitioning.

Binary tree-based partitioning may be performed on a coding block in which quad tree-based partitioning is no longer performed. A coding block partitioned based on a binary tree may be configured such that at least one of quad tree-based partitioning, triple tree-based partitioning, or binary tree-based partitioning is no longer performed.

Alternatively, triple tree-based partitioning or binary tree-based partitioning may be allowed for a coding block partitioned based on a binary tree, and only one of a horizontal or vertical partitioning may be limited allowed.

For example, according to a position, an index, a shape, an additional partitioning shape of a neighboring partition, or the like of a coding block partitioned based on a binary tree, additional partitioning or additional partitioning direction may be limited for a coding block partitioned based on a binary tree. For example, among two coding blocks generated by a binary tree-based partitioning, assuming that an index of a coding block having an earlier coding order is 0 (hereinafter, referred to as a coding block index 0) and an index of a coding block having a later coding order is 1 (hereinafter, referred to as coding block index 1), when a binary tree-based partitioning is applied both of coding blocks of coding block index 0 and coding block index 1, a binary tree-based partitioning direction of the coding block having coding block index 1 may be determined according to a binary tree-based partitioning direction of the coding block having coding block index 0. Specifically, when a binary tree-based partitioning direction of the coding block having coding block index 0 partitions the coding block having coding block index of 0 into square partitions, a binary tree-based partitioning of the coding block having coding block index 1 may have a different direction from a binary tree-based partitioning of the coding block having coding block index 1. That is, partitioning both of the coding blocks having coding block index 0 and coding block index 1 into square partitions may be limited. In this case, encoding/decoding of information indicating a binary tree partitioning direction of a coding block having coding block index 1 may be omitted. Partitioning both of the coding blocks having coding block index 0 and coding block index 1 into square partitions has the same effect as partitioning an upper depth block based on a quad tree, and thus allowing partitioning both of the coding blocks having coding block index 0 and coding block index 1 into square partitions is undesirable in terms of coding efficiency.

Triple tree-based partitioning means partitioning a coding block into three partitions in a horizontal or vertical direction. All three partitions generated by triple tree-based partitioning may have different sizes. Alternatively, two of the partitions generated by triple tree-based partitioning may have the same size, and the other one may have a different size. For example, the width ratio or height ratio of partitions generated by partitioning a coding block may be set to 1:n:1, 1:1:n, n:1:1 or m:n:1 depending on a partitioning direction. Here, m and n may be 1 or a real number greater than 1, for example, an integer such as 2.

Triple tree-based partitioning may be performed on a coding block in which quad tree-based partitioning is no longer performed. For a coding block partitioned based on a triple tree, it may be configured that at least one of quad tree-based partitioning, triple tree-based partitioning, or binary tree-based partitioning is no longer performed.

Alternatively, triple tree-based partitioning or binary tree-based partitioning may be allowed for a coding block partitioned based on a triple tree, and only one of horizontal partitioning or vertical partitioning may be limitedly allowed.

For example, according to a position, an index, a shape, an additional partitioning shape of a neighboring partition, or the like of a coding block partitioned based on a triple tree, additional partitioning or additional partitioning direction may be limited for a coding block partitioned based on a triple tree. For example, one of horizontal partitioning or vertical partitioning may be limited to a partition having the largest size among coding blocks generated by triple tree-based partitioning. Specifically, for a partition having the largest size among coding blocks generated by triple tree-based partitioning, binary tree partitioning or triple tree partitioning having the same direction as the triple tree partitioning direction of an upper depth partition may not be allowed. In this case, for a partition having the largest size among coding blocks generated by triple tree-based partitioning, encoding/decoding of information indicating a partitioning binary tree direction or a triple tree partitioning direction may be omitted.

Depending on a size or shape of a current block, partitioning based on a binary tree or triple tree may be limited. Here, the size of the current block may be expressed based on at least one of the width, height, minimum/maximum of width/height, summation of width and height, multiplication of width and height of the current block, or the number of samples included in the current block. For example, when at least one of the width or height of the current block is larger than a predefined value, partitioning based on a binary tree or triple tree may not be allowed. Here, the predefined value may be an integer such as 16, 32, 64, or 128. As another example, when the width-to-height ratio of the current block is larger than a predefined value or smaller than a predefined d value, partitioning based on a binary tree or triple tree may not be allowed. When the predefined value is 1, partitioning based on a binary tree or triple tree may be allowed only when the current block is a square block having the same width and height.

Partitioning of a lower depth may be dependently determined based on a partitioning shape of an upper depth. For example, when binary tree-based partitioning is allowed in two or more depths, binary tree-based partitioning of the same shape as a binary tree partitioning of an upper depth may be allowed in a lower depth. For example, when binary tree-based partitioning of 2N×N shape is performed at an upper depth, binary tree-based partitioning of 2N×N shape may also be performed at a lower depth. Alternatively, when binary tree-based partitioning of N×2N shape is performed at an upper depth, binary tree-based partitioning of N×2N shape may also be performed at a lower depth.

In addition, only binary tree-based partitioning of a shape different from a binary tree partitioning shape of an upper depth may be allowed in a lower depth.

For a sequence, slice, coding tree unit, or coding unit, it may be limited such that only a specific shape of binary tree-based partitioning or a specific shape of triple tree-based partitioning is to be used. For example, it may be limited to allow only binary tree-based partitioning of 2N×N or N×2N shape for a coding tree unit. The allowed partition type may be predefined in an encoder or decoder, or may be signaled through a bitstream by encoding information on an allowed partition type or non-allowed partition type.

Figure 5A:
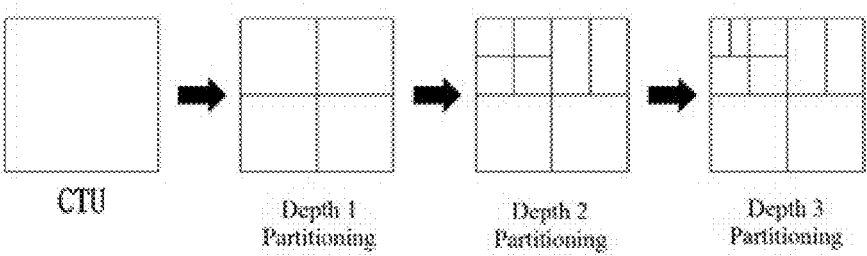
FIGS. 5A and 5B are diagrams illustrating an example in which only a specific shape of binary tree-based partitioning is allowed.
Figure 5B:
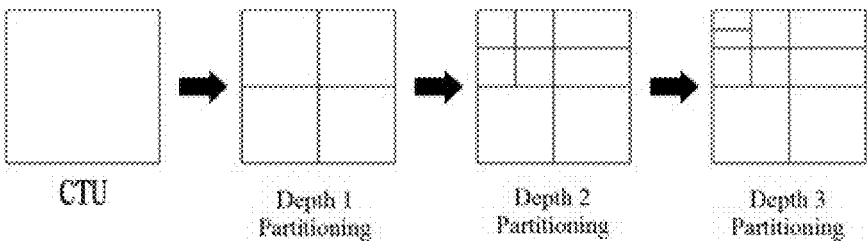

FIGS. 5A and 5B are diagrams illustrating an example in which only a specific shape of binary tree-based partitioning is allowed. In FIG. 5A, illustrates an example in which only N×2N shape of binary tree-based partitioning is allowed, and FIG. 5B illustrates an example in which only 2N×N shape of binary tree-based partitioning is allowed. For implementing adaptive partitioning based on a quad tree or binary tree, information indicating quad tree-based partitioning, information on a size/depth of a coding block that allows quad tree-based partitioning, information indicating binary tree-based partitioning, information on a size/depth of a coding block that allows binary tree-based partitioning, information on a size/depth of a coding block that does not allow binary tree-based partitioning, information whether a binary tree-based partitioning is vertical or horizontal, or the like may be used.

In addition, for a coding tree unit or a predetermined coding unit, a number of times that binary tree partitioning/triple tree partitioning is allowed, a depth that binary tree partitioning/triple tree partitioning is allowed, a number of depths that binary tree partitioning/triple tree partitioning is allowed, or the like may be obtained. The information may be encoded in a unit of a coding tree unit or a coding unit and transmitted to a decoder through a bitstream.

For through example, a bitstream, a syntax 'max_binary_depth_idx_minus1' indicating a maximum depth that binary tree partitioning is allowed may be encoded/decoded. In this case, max_binary_depth_idx_minus1+1 may indicate the maximum depth that binary tree partitioning is allowed.

Figure 6:
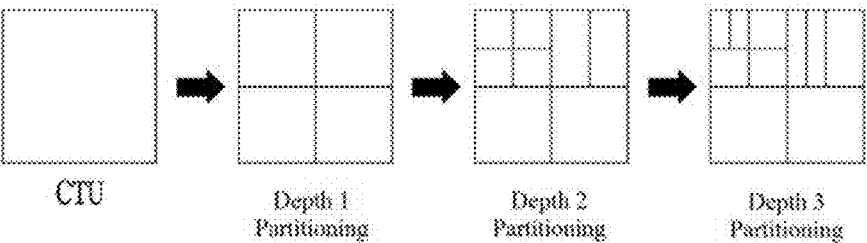
FIG. 6 is a diagram for describing an example in which information related to a number of times allowed for a binary tree partitioning is encoded/decoded according to an embodiment to which the present invention is applied.

Referring to the example shown in FIG. 6, in FIG. 6, it is shown that binary tree partitioning is performed for a coding unit having a depth of 2 and a coding unit having a depth of 3. Accordingly, at least one of information indicating the number of times (2 times) that binary tree partitioning has been performed in the coding tree unit, information indicating the maximum depth (depth 3) that binary tree partitioning is allowed in the coding tree unit, or the number of depths (2 depths, depth 2 and depth 3) that binary tree partitioning is allowed in the coding tree unit may be encoded/decoded through the bitstream.

As another example, at least one of a number of times that binary tree partitioning/triple tree partitioning is allowed, a depth that binary tree partitioning/triple tree partitioning is allowed, or a number of depths that binary tree partitioning/triple tree partitioning is allowed may be obtained for each sequence, picture, or slice. For example, the information may be encoded in a unit of a sequence, a picture or a slice and transmitted through a bitstream. Alternatively, a depth that binary tree partitioning/triple tree partitioning is allowed, a number of depths that binary tree partitioning/triple tree partitioning is allowed may be predefined for each sequence, picture, or slice. Accordingly, for a first slice and a second slice, at least one of a number of times that binary tree partitioning/triple tree partitioning is allowed, a depth that binary tree partitioning/triple tree partitioning is allowed, or a number of depths that binary tree partitioning/triple tree partitioning is allowed may differ. For example, in the first slice, binary tree partitioning may be allowed only at one depth, while in the second slice, binary tree partitioning may be allowed at two depths.

As another example, at least one of a number of times that binary tree/triple tree partitioning is allowed, a depth that binary tree/triple tree partitioning is allowed, or a number of depths that binary tree/triple tree partitioning is allowed may be set differently according to a temporal level identifier (TemporalID) of a slice or picture. Here, the temporal level identifier (TemporalID) is used to identify each of a plurality of layers of an image having a scalability of at least one of view, spatial, temporal, or quality.

As shown in FIG. 3, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding binary block that tree-based partitioning is allowed, and the information on the size/depth of the coding block that binary tree-based partitioning is not allowed.

A number of a candidate that represent a size of a coding block may be limited to a predetermined number, or a size of a coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree, a binary tree, and a triple tree, a coding unit may be represented as square or rectangular shape of an arbitrary size.

A coding block may be encoded/decoded using at least one of a skip mode, an intra prediction, an inter prediction, or a skip method.

As another example, intra prediction or inter prediction may be performed in a unit having a size equal to or smaller than a coding block through partitioning of the coding block. To this end, when a coding block is determined, a prediction block may be determined through predictive partitioning of the coding block. Predictive partitioning of a coding block may be performed by a partition mode (Part_mode) indicating a partition type of the coding block. The size or shape of the prediction block may be determined according to the partition mode of the coding block. For example, the size of the prediction block determined according to the partition mode may have a value equal to or smaller than the size of the coding block.

Figure 7:
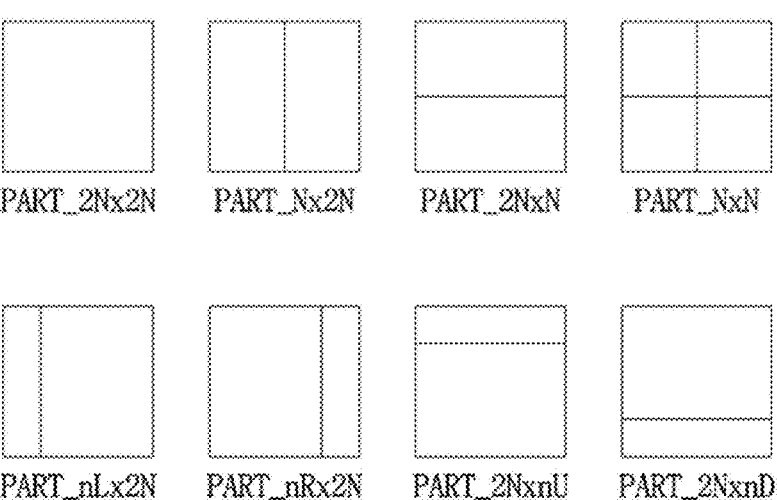
FIG. 7 is a diagram illustrating a partition mode that may be applied to a coding block as an embodiment to which the present invention is applied.

FIG. 7 is a diagram illustrating a partition mode that may be applied to a coding block when the coding block is encoded by inter prediction.

When a coding block is encoded by inter prediction, any one of eight partition modes may be applied to the coding block, as in the example illustrated in FIG. 7.

When a coding block is encoded by intra prediction, partition mode PART_2N×2N or PART_N×N may be applied to the coding block.

PART_N×N may be applied when a coding block has a minimum size. Here, the minimum size of the coding block may be predefined in an encoder and a decoder. Alternatively, information on the minimum size of the coding block may be signaled through a bitstream. For example, the minimum size of the coding block may be signaled through a slice header, and accordingly, the minimum size of the coding block may be defined for each slice.

In general, a size of a prediction block may have a size of 64×64 to 4×4. However, when a coding block is encoded by inter prediction, when a motion compensation is performed, a prediction block may not have a size of 4×4 in order to reduce a memory bandwidth.

Figure 8:
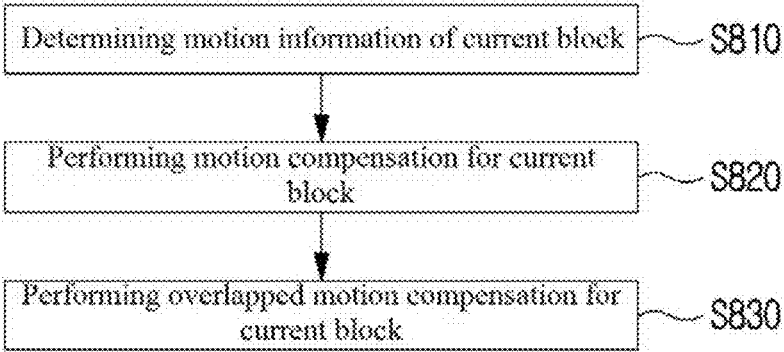
FIG. 8 is a flowchart illustrating an inter prediction method as an embodiment to which the present invention is applied.

FIG. 8 is a flowchart illustrating an inter prediction method as an embodiment to which the present invention is applied.

Referring to FIG. 8, motion information of a current block may be determined (S810). The motion information of the current block may include at least one of a motion vector of the current block, a reference picture index of the current block, or an inter prediction direction of the current block.

The motion information of the current block may be obtained based on at least one of information signaled through a bitstream or motion information of a neighboring block neighboring the current block.

Figure 9:
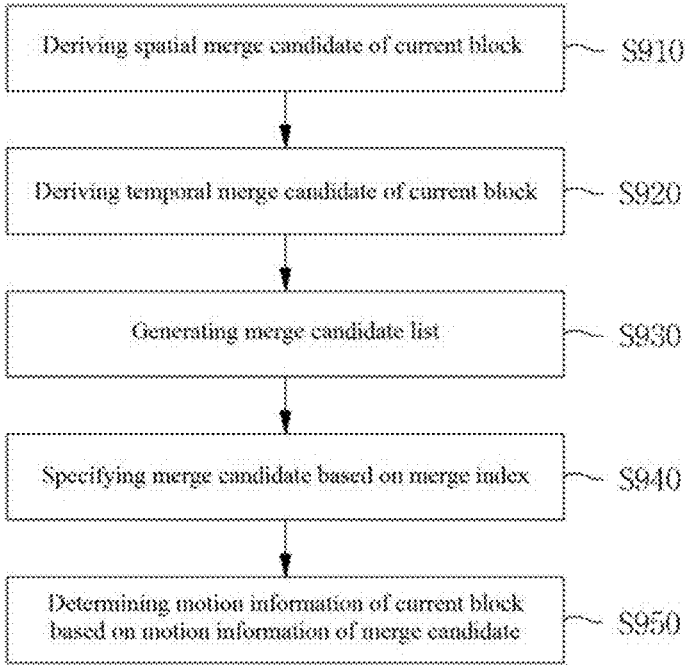
FIG. 9 is a diagram illustrating a procedure of deriving motion information of a current block when a merge mode is applied to the current block.

FIG. 9 is a diagram illustrating a procedure of deriving motion information of a current block when a merge mode is applied to the current block.

A merge mode represents a method of deriving motion information of a current block from a neighboring block.

When a merge mode is applied to a current block, a spatial merge candidate may be derived from a spatial neighboring block of the current block (S910). The spatial neighboring block may include at least one of a block adjacent to a top, left, or corner (e.g., at least one of a top left corner, a right top corner, or a left bottom corner) of the current block.

Figure 10:
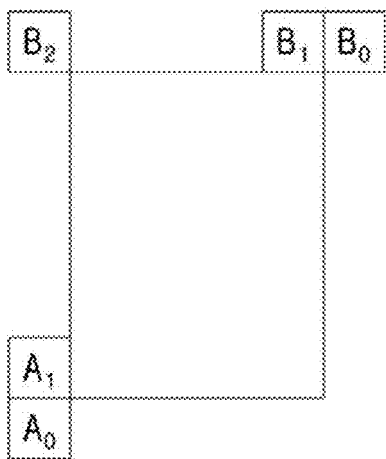
FIG. 10 is a diagram illustrating an example of a spatial neighboring block.

FIG. 10 is a diagram illustrating an example of a spatial neighboring block.

As in the example shown in FIG. 10, a spatial neighboring block includes at least one of a neighboring block $A_1$ neighboring the left of the current block, a neighboring block $B_1$ neighboring the top of the current block, a neighboring block $A_0$ neighboring the left bottom corner of the current block, a neighboring block $B_0$ neighboring the right top corner of the current block, and a neighboring block $B_2$ neighboring the left top corner of the current block.

Further expanding the embodiment of FIG. 10, at least one of a block neighboring the left top sample, a block neighboring the top center sample, or a block neighboring the right top sample of the current block may be defined as a neighboring block neighboring the top of the current block, and at least one of a block neighboring the left top sample, a block neighboring the left center sample, a block or neighboring the left bottom sample of the current block may be defined as a neighboring block neighboring the left of the current block.

In addition, a spatial merge candidate may be derived from spatial non-neighboring blocks that are not adjacent to the current block. For example, a spatial merge candidate of the current block may be derived using at least one of a block located on the same vertical line as the block adjacent to the top, right top corner, or left top corner of the current block, a block located on the same horizontal line as the block adjacent to the left, left bottom corner, or left top corner of the current block, or a block located on the same diagonal line as the block adjacent to a corner of the current block. As a specific example, when a neighboring block adjacent to the current block cannot be used as a merge candidate, a block not adjacent to the current block may be used as a merge candidate of the current block.

Motion information of a spatial merge candidate may be set to be the same as the motion information of the spatial neighboring block.

A spatial merge candidate may be determined by searching for neighboring blocks in a predetermined order. For example, a search for determining a spatial merge candidate may be performed in the order of $A_1$, $B_1$, $B_0$, $A_0$, and $B_2$ blocks. In this case, B2 block may be used when at least one of the other blocks (i.e., $A_1$, $B_1$, $B_0$, and $A_0$) does not exist or at least one is encoded by intra prediction mode.

The search order of the spatial merge candidate may be predefined in the encoder/decoder. Alternatively, the search order of the spatial merge candidate may be adaptively determined according to a size or shape of a current block. Alternatively, the search order of the spatial merge candidate may be determined based on information signaled through a bitstream.

A temporal merge candidate may be derived from a temporal neighboring block of the current block (S920). The temporal neighboring block may mean a co-located block included in a collocated picture. The collocated picture has a different temporal order (Picture Order Count, POC) than a current picture including the current block. The collocated picture may be determined as a picture having a predefined index in a reference picture list or a picture having a smallest output order (POC) difference from the current picture. Alternatively, the collocated picture may be determined by information signaled from a bitstream. The information signaled from the bitstream may include at least one of information indicating a reference picture list (e.g., L0 reference picture list or L1 reference picture list) including the collocated picture and/or an index indicating the collocated picture in the reference picture list. Information for determining a collocated picture may be signaled in at least one of a picture parameter set, a slice header, or a block level.

Motion information of a temporal merge candidate may be determined based on motion information of a collocated block. For example, a motion vector of a temporal merge candidate may be determined based on a motion vector of a collocated block. For example, the motion vector of the temporal merge candidate may be set to be the same as the motion vector of the collocated block. Alternatively, the motion vector of the temporal merge candidate is derived by scaling the motion vector of the collocated block based on output order (POC) difference between the current picture and the reference picture of the current block and/or the output order (POC) difference between the collocated picture and the reference picture of the collocated picture.

Figure 11:
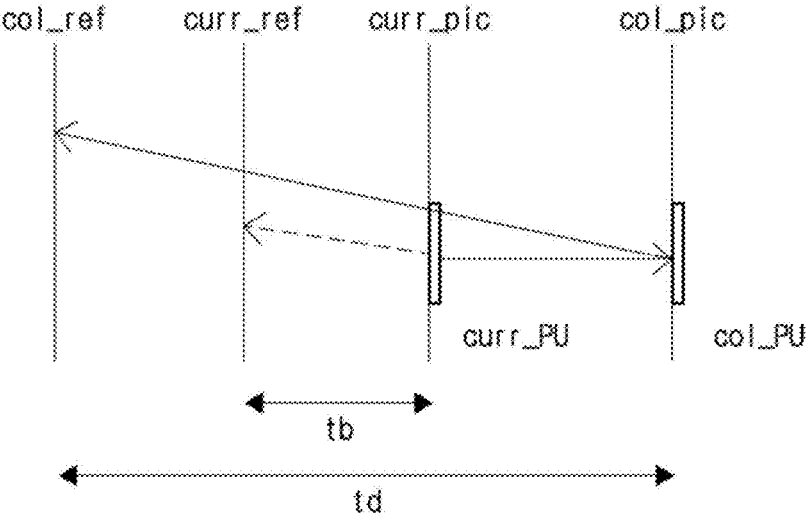
FIG. 11 is a diagram for describing an example of deriving a motion vector of a temporal merge candidate.

FIG. 11 is a diagram for describing an example of deriving a motion vector of a temporal merge candidate.

In the example shown in FIG. 11, tb represents a POC difference between a current picture (curr_pic) and a reference picture (curr_ref) of the current picture, and td represents a POC difference between a collocated picture (col_pic) and a reference picture (col_ref) of a collocated block. A motion vector of a temporal merge candidate may be derived by scaling a motion vector of a collocated block (col_PU) based on tb and/or td.

Alternatively, considering an availability of a collocated block, both a motion vector of the collocated block and a motion vector scaled thereof may be used as a motion vector of a temporal merge candidate. For example, a motion vector of a collocated block may be set as a first temporal merge candidate motion vector, and a scaled value of the motion vector of the collocated block may be set as a second temporal merge candidate motion vector.

An inter prediction direction of a temporal merge candidate may be set to be the same as an inter prediction direction of a temporal neighboring block. Here, a reference picture index of a temporal merge candidate may have a fixed value. For example, the reference picture index of the temporal merge candidate may be set to '0'. Alternatively, the reference picture index of the temporal merge candidate may be adaptively determined based on at least one of a reference picture index of a spatial merge candidate, or a reference picture index of a current picture.

A collocated block may be determined as any block in a block having the same position and size as a current block in a collocated picture or a block adjacent to a block having the same position and size as a current block.

Figure 12:
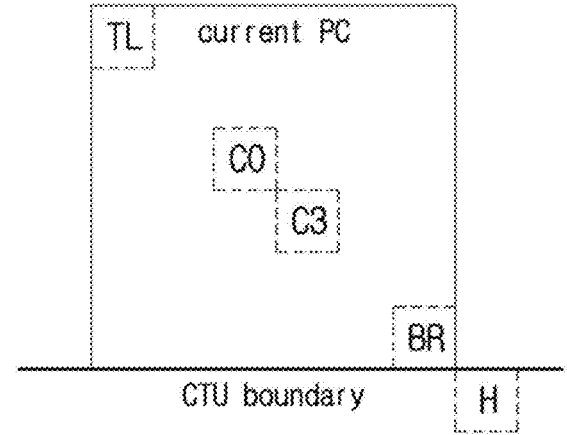
FIG. 12 is a diagram illustrating positions of candidate blocks that may be used as a collocated block.

FIG. 12 is a diagram illustrating positions of candidate blocks that may be used as a collocated block.

A candidate block may include at least one of a block adjacent to the left top corner position of a current block in a collocated picture, a block adjacent to a center sample position of a current block, or a block adjacent to the left bottom corner position of a current block.

For example, a candidate block may include a block TL including a left top sample position of a current block in a collocated picture, a block BR including a right bottom sample position of a current block, and a block H adjacent to a right bottom corner of a current block, a block C3 including a center sample position of a current block, or a block C0 (e.g., a block including a sample position spaced apart by (−1, −1) from a center sample of a current block) adjacent to a center sample of a current block.

In addition to the example shown in FIG. 12, a block including a position of a neighboring block adjacent to a predetermined boundary of a current block in a collocated picture may be selected as a collocated block.

A number of temporal merge candidates may be one or more. For example, one or more temporal merge candidates may be derived based on one or more collocated blocks.

Information on a maximum number of temporal merge candidates may be encoded and signaled in an encoder. Alternatively, a maximum number of temporal merge candidates may be derived based on a maximum number of merge candidates and/or a maximum number of spatial merge candidates that may be included in a merge candidate list. Alternatively, a maximum number of temporal merge candidates may be determined based on a number of available collocated blocks.

An availability of candidate blocks may be determined according to a predetermined priority, and at least one collocated block may be determined based on the determination and a maximum number of temporal merge candidates. For example, when a block C3 including a center sample position of a current block and a block H adjacent to a right bottom corner of a current block are candidate blocks, any one of the blocks C3 and H may be determined as a collocated block. When the block H is available, the block H may be determined as a collocated block. On the other hand, when the block H is unavailable (e.g., when the block H is encoded by intra prediction, when the block H is not available or when the block H is located outside the largest coding unit (LCU), etc.), the block C3 may be determined as a collocated block.

For another example, when at least one of a plurality of blocks adjacent to a right bottom corner position of a current block in a collocated picture is unavailable (e.g., the block H block and/or the block BR), the unavailable block may be replaced with another block that is available. That another block replacing the unavailable block may include at least one of a block (e.g., C0 and/or C3) adjacent to a center sample position of a current block in a collocated picture or a block (e.g., TL) adjacent to a left top corner position of a current block.

When at least one of a plurality of blocks adjacent to a central sample position of a current block in a collocated picture is unavailable or when at least one of a plurality of blocks adjacent to a left top corner position of a current block in a collocated picture is unavailable, the unavailable block may be replaced with another block that is available.

Thereafter, a merge candidate list including a spatial merge candidate and a temporal merge candidate may be generated (S930).

Information on a maximum number of merge candidates may be signaled through a bitstream. For example, information indicating the maximum number of merge candidates may be signaled through a sequence parameter or a picture parameter. For example, when the maximum number of merge candidates is five, those five may be selected by summing spatial merge candidates and temporal merge candidates. For example, four of five spatial merge candidates may be selected, and one of two temporal merge candidates may be selected. When a number of merge candidates included in a merge candidate list is smaller than the maximum merge candidate number, a combined merge candidate by combining two or more merge candidates or a merge candidate having a (0,0) motion vector (zero motion vector) may be included in the merge candidate list.

Merge candidates may be included in a merge candidate list according to a predefined priority. The higher the priority, the smaller the index assigned to a merge candidate. For example, a spatial merge candidate may be added to a merge candidate list before a temporal merge candidate. In addition, spatial merge candidates may be added to a merge candidate list in the order of a spatial merge candidate of a left neighboring block, a spatial merge candidate of a top neighboring block, a spatial merge candidate of a block adjacent to a right top corner, a spatial merge candidate of a block adjacent to a left bottom corner, and a spatial merge candidate of a block adjacent to a top left corner. Alternatively, a spatial merge candidate derived from a neighboring block (B2 in FIG. 10) adjacent to a left top corner of a current block may be set to be added to a merge candidate list with a lower priority than a temporal merge candidate.

For another example, priorities between merge candidates may be determined according to a size or shape of a current block. For example, when a current block has a rectangular shape having a width greater than a height, a spatial merge candidate of a left neighboring block may be added to a merge candidate list before a spatial merge candidate of a top neighboring block. On the other hand, when a current block has a rectangular shape having a height greater than a width, a spatial merge candidate of a top neighboring block may be added to a merge candidate list before a spatial merge candidate of a left neighboring block.

For another example, priorities between merge candidates may be determined according to motion information of each of the merge candidates. For example, a merge candidate having bidirectional motion information may have a higher priority than a merge candidate having unidirectional motion information. Accordingly, a merge candidate having bidirectional motion information may be added to a merge candidate list before a merge candidate having unidirectional motion information.

For another example, after generating a merge candidate list according to a predefined priority, merge candidates may be rearranged. Rearrangement may be performed based on motion information of the merge candidates. For example, rearrangement may be performed based on at least one of whether a merge candidate has bidirectional motion information, a size of a motion vector, or a temporal order (POC) between a current picture and a reference picture of a merge candidate. Specifically, rearrangement may be performed such that a merge candidate having bidirectional motion information has a higher priority than a merge candidate having unidirectional motion information When a merge candidate list is generated, at least one of merge candidates included in the merge candidate list may be specified based on a merge candidate index (S940).

Motion information of a current block may be set to be the same as motion information of a merge candidate specified by a merge candidate index (S950). For example, when a spatial merge candidate is selected by a merge candidate index, motion information of a current block may be set to be the same as motion information of a spatial neighboring block. Alternatively, when a temporal merge candidate is selected by a merge candidate index, motion information of a current block may be set to be the same as motion information of a temporal neighboring block.

FIG. 13 is a diagram illustrating a procedure of deriving motion information of a current block when an AMVP mode is applied to the current block.

When an AMVP mode is applied to a current block, at least one of an inter prediction direction or a reference picture index of the current block may be decoded from a bitstream (S1310). That is, when an AMVP mode is applied, at least one of an inter prediction direction or a reference picture index of a current block may be determined based on information encoded through a bitstream.

A spatial motion vector candidate may be determined based on a motion vector of a spatial neighboring block of a current block (S1320). A spatial motion vector candidate may include at least one of a first spatial motion vector candidate derived from a top neighboring block of a current block, or a second spatial motion vector candidate derived from a left neighboring block of a current block. Here, the top neighboring block may include at least one of blocks adjacent to a top or top right corner of the current block, and the left neighboring block of the current block may include at least one of blocks adjacent to a left or left bottom corner of the current block. A block adjacent to a left top corner of a current block may be treated as a top neighboring block, or may be treated as a left neighboring block.

Alternatively, a spatial motion vector candidate may be derived from a spatial non-neighboring block not neighboring a current block. For example, a spatial motion vector candidate of a current block may be derived using at least one of a block located on a same vertical line as a block adjacent to a top, right top corner, or left top corner of the current block, a block located on a same horizontal line as a block adjacent to a left, left bottom corner, or left top corner of the current block, or a block located on a same diagonal line as a block adjacent to a corner of the current block. When a spatial neighboring block is unavailable, a spatial non-neighboring block may be used to derive a spatial motion vector candidate.

For another example, two or more spatial motion vector candidates may be derived using a spatial neighboring block and a spatial non-neighboring block. For example, a first spatial motion vector candidate and a second spatial motion vector candidate may be derived based on neighboring blocks adjacent to a current block, while a third spatial motion vector candidate and/or a fourth spatial motion vector candidate may be derived based on neighboring blocks which are not adjacent to the current block but adjacent to the neighboring blocks.

When reference pictures are different between a current block and a spatial neighboring block, a spatial motion vector may be obtained by scaling a motion vector of the spatial neighboring block. A temporal motion vector candidate may be determined based on a motion vector of a temporal neighboring block of a current block (S1330). When reference pictures are different between a current block and a temporal neighboring block, a temporal motion vector may be obtained by scaling a motion vector of the temporal neighboring block. In this case, a temporal motion vector candidate may be derived only when a number of spatial motion vector candidates is less than or equal to a predetermined number.

A motion vector candidate list including a spatial motion vector candidate and a temporal motion vector candidate may be generated (S1340).

When a motion vector candidate list is generated, at least one of motion vector candidates included in the motion vector candidate list may be specified based on information specifying at least one motion vector candidate of the motion vector candidate list (S1350).

A motion vector candidate specified by the information may be set as a motion vector prediction value of a current block, and a motion vector differential value is added to the motion vector prediction value to obtain a motion vector of the current block (S1360). In this case, the motion vector differential value may be parsed through a bitstream.

When motion information of a current block is obtained, motion compensation for the current block may be performed based on the obtained motion information (S820). Specifically, motion compensation for a current block may be performed based on an inter prediction direction, a reference picture index, and a motion vector of the current block.

When a prediction sample is obtained as a result of performing motion compensation, a current block may be reconstructed based on the generated prediction sample.

Specifically, a reconstructed sample may be obtained by adding the prediction sample and a residual sample of the current block.

Motion information of a merge candidate may be updated or motion information of a current block which is acquired based on a merge candidate or a motion vector candidate may be updated to obtain updated motion information of the current block. For example, motion information of a spatial merge candidate or a temporal merge candidate may be updated under a merge mode, or motion information of a current block which is derived from motion information of a spatial merge candidate or a temporal merge candidate may be updated. Here, motion information to be updated may include a motion vector. In addition to a motion vector, at least one of a reference picture index or a prediction direction may be updated.

An update of motion information may be performed in a same manner in an encoding apparatus and a decoding apparatus. As a decoding apparatus performs an update in a same manner as an encoding apparatus, encoding of information indicating the difference between motion information before and after the update may be omitted.

As such, updating motion information of a merge candidate by a decoding apparatus in a same manner as an encoding apparatus may be referred to as a decoder side merge candidate refinement (DMCR), and updating motion information of a current block by a decoding apparatus in a same manner as an encoding apparatus may be referred to as a decoder side motion vector refinement (DMVR).

Whether to perform DMCR or DMVR may be determined based on at least one of a size, shape (square/non-square), block level (coding block/sub block), inter prediction mode of a current block, whether a merge candidate with a same motion information exist, or whether a bidirectional prediction is performed for a current block. For example, DMCR may be set to be performed only for a merge candidate having a bidirectional prediction direction, or may be set to be performed only for merge candidates having a same motion information. Alternatively, DMVR may not be performed when an inter prediction mode of a current block is an AMVP mode, whereas at least one of DMCR or DMVR may be performed when an inter prediction mode of a current block is a merge mode. Contrary to the example described above, when an inter prediction mode of a current block is an AMVP mode, DMVR may be set to be performed.

Alternatively, information indicating whether to perform DMCR or DMVR may be signaled via a bitstream. The information may be signaled at at least one of a block level, slice level, or picture level.

A decoding apparatus may update a motion vector of a current block or a merge candidate in a same manner as an encoding apparatus.

For example, to update a motion vector of a current block, after deriving an initial motion vector of the current block, a refined motion vector (Refined MV) for a neighboring search point may be derived based on the current block initial motion vector. Here, the initial motion vector of the current block may be derived based on a candidate having a lowest cost among merge candidates or motion vector candidates. A decoder may select a merge candidate or a motion vector candidate having a lowest cost based on index information. When a refined motion vector for a neighboring search point is derived, a motion vector of a current block may be determined based on the derived refined motion vector. Specifically, a motion vector having a minimum cost (e.g., a minimum RD-cost) among refined motion vectors for a plurality of search points may be searched for, and the found motion vector having the minimum cost may be used as a motion vector of a current block.

For another example, to update a motion vector of a merge candidate, a refined motion vector (Refined MV) for a neighboring search point may be derived based on the motion vector of the merge candidate. When a refined motion vector for a neighboring search point is derived, a motion vector of a merge candidate may be determined based on the derived refined motion vector. Specifically, a motion vector having a minimum cost (e.g., a minimum RD-cost) among refined motion vectors for a plurality of search points may be searched for, and the found motion vector having the minimum cost may be used as a motion vector of a merge candidate.

Hereinafter, with reference to the drawings, a method of updating motion information of a current block will be described in detail. For convenience of description, it is assumed that updated motion information is a motion vector.

Figure 14:
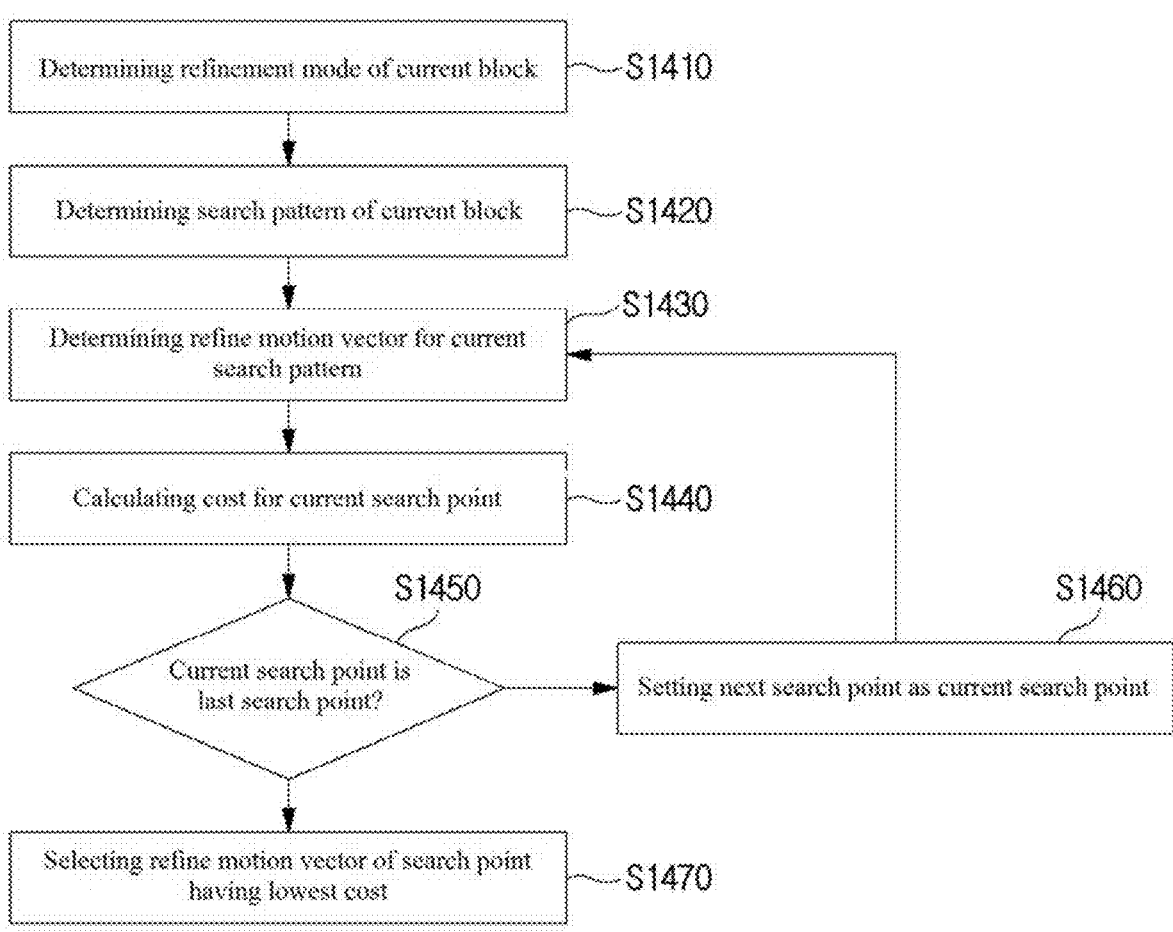
FIG. 14 is a diagram illustrating a method for updating a motion vector of a current block according to an embodiment of the present invention.
Figure 15:
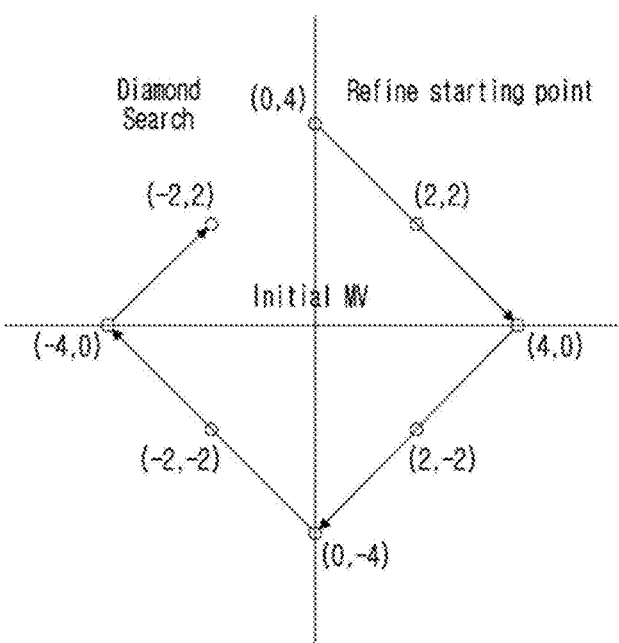
FIG. 15 is a diagram illustrating a diamond pattern.
Figure 16:
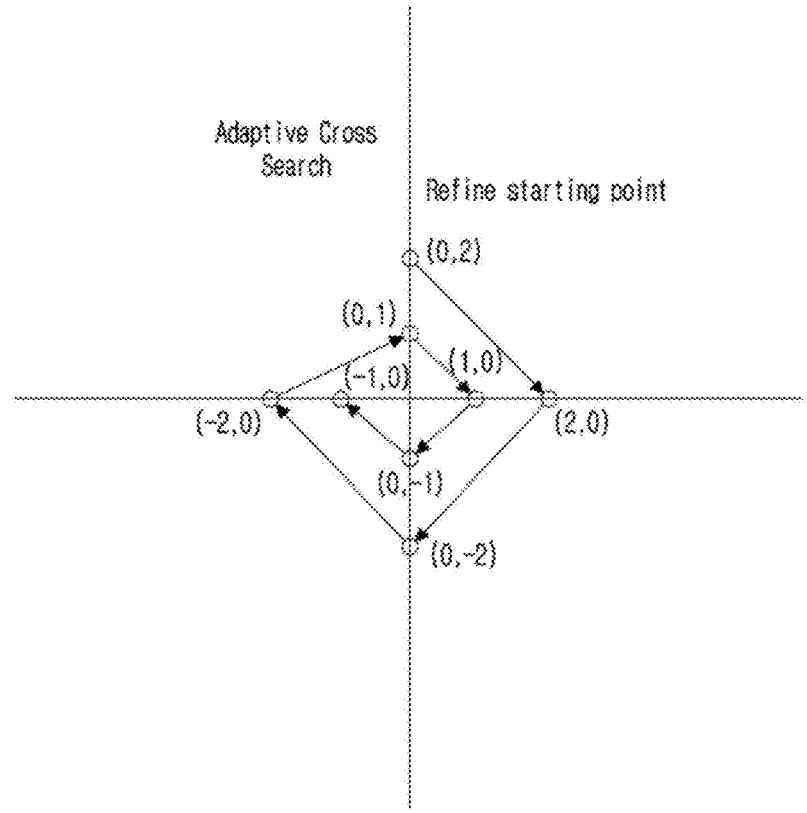
FIG. 16 is a diagram illustrating an adaptive cross pattern.
Figure 17:
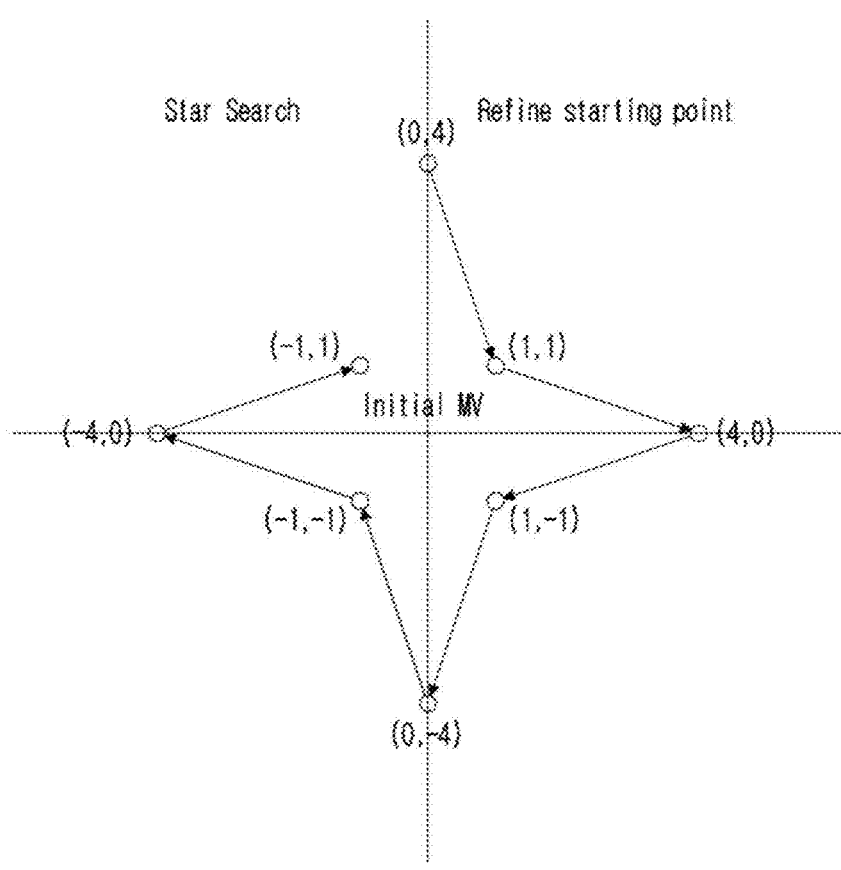
FIG. 17 is a diagram illustrating a star pattern.
Figure 18:
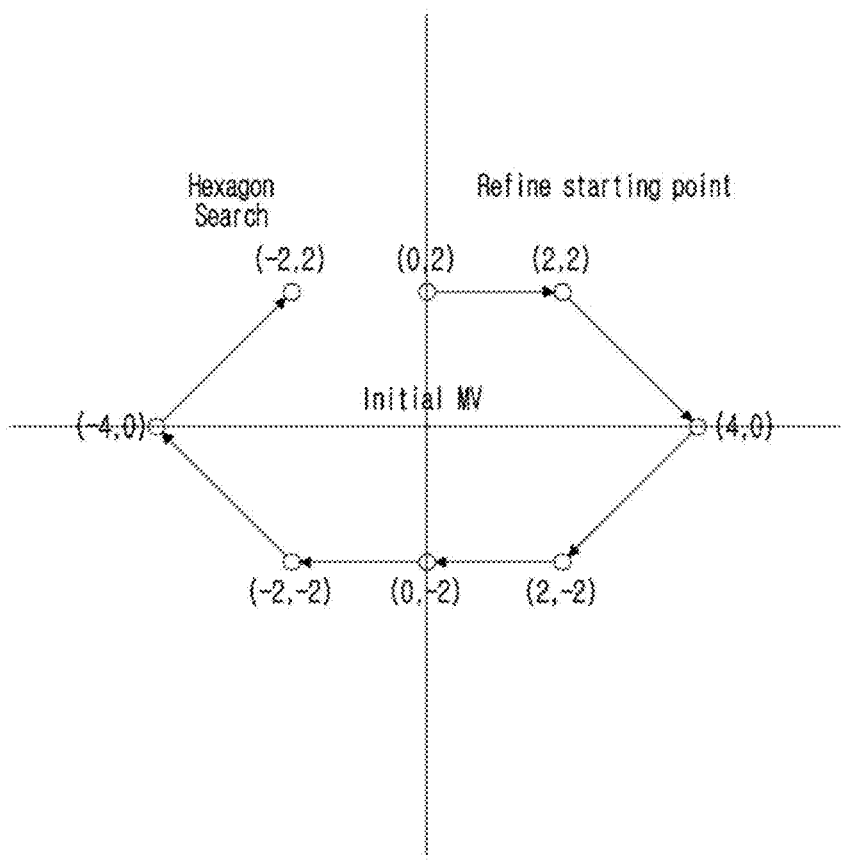
FIG. 18 is a diagram illustrating a hexagon pattern.

FIG. 14 is a diagram illustrating a method for updating a motion vector of a current block according to an embodiment of the present invention.

In order to update a motion vector of a current a refinement mode for the current block may be block, determined (S1410). The refinement mode may indicate at least one of bi-lateral matching or template matching.

Bi-lateral matching is a method of searching for motion vectors and reference blocks following a motion trajectory of a bidirectional motion vector, assuming that the bidirectional motion vectors of a current block exist in a same motion trajectory. When using bi-lateral matching, a motion vector of a current block may be updated based on a bi-lateral template calculated by a bidirectional motion vector of the current block. Specifically, RD cost between reference blocks following the bi-lateral template and the motion trajectory of the bidirectional motion vector of the current block may be measured to search for reference blocks having a minimum RD cost and a motion vector indicating the reference blocks.

Template matching is a method of deriving motion information of a current block by searching for a region that best matches a template adjacent to the current block in a reference picture. Specifically, after searching for a region in the reference picture having a lowest cost with the template neighboring the current block, a target block adjacent to the found region may be set as a reference block of the current block.

Bi-lateral matching and template matching will be described later with reference to FIGS. 20 and 21.

Information on a search point of a current block may be determined (S1420). The information on the search point of the current block may include at least one of a number of search points, positions of search points, or search order among search points. Information on search point may be stored in a predefined in an encoder and a decoder. In this case, the predefined format related to search point may be referred to as a search pattern or a decoder side merge refinement search pattern.

A search pattern may include a diamond pattern, an adaptive cross pattern, a star pattern and/or a hexagon pattern and the like. For each search pattern, at least one of a number of search points, positions of the search points, or search order of search points may differ.

An encoder and a decoder may select at least one of a plurality of search pattern candidates, and determine at least one of a number, a position, or a search order of search points based on the selected search pattern.

FIGS. 15 to 18 are diagrams showing a diamond pattern, an adaptive cross pattern, a star pattern, and a hexagon pattern, respectively.

A diamond pattern indicates that search points are arranged in a diamond shape around a reference block specified by an initial motion vector. For example, when a coordinate value of a left top of a reference block is (0, 0), a diamond pattern may include search points such as (0, 4), (2, 2), (4, 0), (2, −2), (0, −4), (−2, −2), (−4, 0), (−2, 2).

An adaptive cross pattern indicates that search points are arranged in two diamond shapes around a reference block specified by an initial motion vector. For example, when a coordinate value a left top coordinate of the reference block is (0, 0), the adaptive cross pattern may include search points such as (0, 2), (2, 0), (0, −2), (−2, 0), (0, 1), (1, 0), (0, −1), (−1, 0).

A star pattern indicates that search points are arranged in a star shape around a reference block specified by an initial motion vector. For example, when a coordinate value of a left top of a reference block is (0, 0), a star pattern may include search points such as (0, 4), (1, 1), (4, 0), (1, −1), (0, −4), (−1, −1), (−4, 0), (−1, 1).

A hexagon pattern indicates that search points are arranged in a hexagon shape around a reference block specified by an initial motion vector. For example, when a coordinate value of a left top of a reference block is (0, 0), a hexagon pattern may include search points such as (0, 2), (2, 2), (4, 0), (2, −2), (0, −2), (−2, −2), (−4, 0), (−2, 2).

The examples illustrated in FIGS. 15 to 18 merely describes exemplary embodiments of the present invention, but do not limit the present invention. That is, a motion vector of a current block may be updated by using a search pattern different from those shown in FIGS. 15 to 18.

In addition, a search pattern shown in FIGS. 15 to 18 may be modified to update a motion vector of a current block. For example, in the examples illustrated in FIGS. 15 to 18, a motion vector of a current block may be updated using a search pattern in which a number, positions, or search order of search points are partially modified For another example, positions of search points included in a search pattern may be adaptively determined based on at least one of a size, shape, or output order difference between a current picture and a reference picture of a current block. For example, when a size of a current block is greater than or equal to a predetermined size, the search points shown in FIG. 15 may be used, whereas when the size of the current block is smaller than the predetermined size, search points having ½ coordinate values of the search points shown in FIG. 15 may be used.

A decoder may perform decoder side merge refinement using a same search pattern as an encoder. In order for a decoder to use a same search pattern as an encoder, information for specifying a search pattern used in the encoder may be signaled through a bitstream. The information may be index information for specifying any one of a plurality of search patterns.

Alternatively, a search pattern of a current block may be determined based on at least one of a size, shape (e.g., whether the current block is square or non-square), block level (e.g., whether the current block is a coding block or sub block), inter prediction mode (e.g., merge mode, AMVP mode or skip mode), or refinement mode of the current block. For example, a diamond search may be selected at a coding block level, and a sub-adaptive cross search may be selected at a sub coding block level. Alternatively, it may be set to select a star search or a hexagon search at a coding block level.

Alternatively, it may be determined whether information for specifying a search pattern used in an encoder is signaled based on at least one of a size, shape, block level, inter prediction mode, or refinement mode of a current block.

When a search pattern of a current block is determined, a refined motion vector for a search point may be determined (S1430).

A refined motion vector may be derived based on an initial motion vector of a current block and/or output order (POC) difference between a current picture and a reference picture. Specifically, when a reference block specified by the initial motion vector of the current block is moved to a position of the search point, the distance between the current block and the moved reference block may be set as a refined motion vector for the search point. Accordingly, a refined motion vector may be derived by adding or subtracting a coordinate value corresponding to the position of the search point or N multiples of the coordinate value to or from the initial motion vector of the current block.

Figure 19:
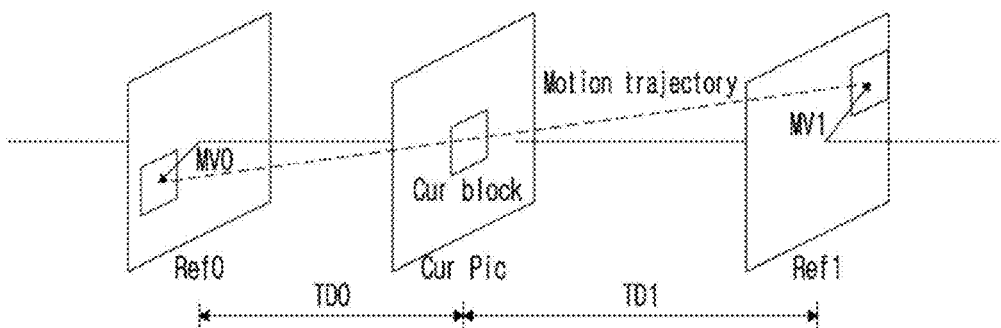
FIG. 19 is a diagram for describing deriving a refined motion vector for a search point.

FIG. 19 is a diagram for describing deriving a refined motion vector for a search point.

For convenience of description, it is assumed that, for a current block, an initial L0 motion vector is (1, 1) and an initial L1 motion vector is (−1, −1). In addition, it is assumed that an output order difference TD0 between a current picture and L0 reference picture (Ref0) and an output order difference TD1 between the current picture and L1 reference picture (Ref1) are the same.

Based on a motion trajectory of a bidirectional motion vector of a current block, a refined motion vector for a search point may be derived. Specifically, when reference blocks specified by the bidirectional motion vector of the current block are moved by a coordinate value of the search point, the distance between the current block and the moved reference block may be derived as a refined motion vector.

For an example, for a search point at position (0, 1), a refined L0 motion vector may be set to (0, 1) and a refined L1 motion vector may be set to (−1, 0). That is, a refined motion vector of a search point may be derived by adding a coordinate value of the search point to an initial motion vector of a current block.

In this case, the refined L0 motion vector and the refined L1 motion vector of the search point may be determined in proportion to TD0 and TD1, respectively. For example, when TD0 and TD1 have a ratio of 1:N, the refined L0 motion vector of the search point may be derived by adding or subtracting the coordinate value (x, y) of the search point to or from the L0 motion vector $(MVx_0, MVy_0)$ of the current block (i.e., $(MVx_0+x, MVy_0+y)$ or $(MVx_0−x, MVy_0−y)$), whereas the refined L1 motion vector of the search point may be derived by adding or subtracting a value (Nx, Ny) of N multiples applied to the coordinate value of the search point to or from the L1 motion vector $(MVx_1, MVy_1)$ of the current block (i.e., $(MVXx_1+Nx, MVy_1+Ny)$ or $(MVx_1−Nx, MVy_1−Ny)$). On the other hand, when TD0 and TD1 have a ratio of N:1, the refined L0 motion vector of the search point may be derived by adding or subtracting a value (Nx, Ny) of N multiples applied to the coordinate value of the search point to or from the L0 motion vector $(MVx_0, MVy_0)$ of the current block (i.e., $(MVx_0+Nx, MVy_0+Ny)$ or $(MVx_0−Nx, MVy_0−Ny)$), whereas the refined L1 motion vector of the search point may be derived by adding or subtracting the coordinate value (x, y) of the search point to or from the L1 motion vector $(MVx_1, MVy_1)$ of the current block (i.e., $(MVx_1+x, MVy_1+y)$ or $(MVx_1−x, MVy_1−y)$).

Consequently, a refined motion vector for a specific position sample may be determined in consideration of a temporal difference between a current picture and a reference picture.

When a refined motion vector for a search point is derived, a cost of the search point may be measured based on the derived refined motion vector (S1440).

Figure 20:
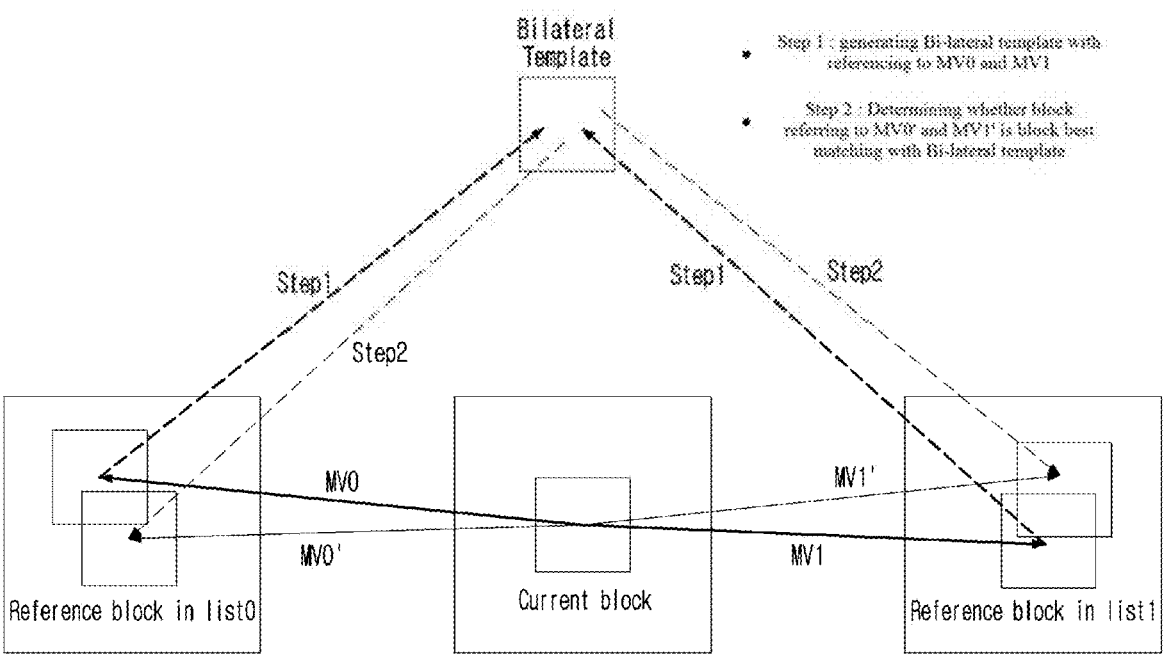
FIG. 20 is a diagram for describing an example of measuring a cost of a search point when a refinement mode is bi-lateral matching.

FIG. 20 is a diagram for describing an example of measuring a cost of a search point when a refinement mode is bi-lateral matching.

When a refinement mode of a current block is bi-lateral matching, RD cost between an initial prediction block (or initial bi-lateral template) derived based on an initial motion vector of a current block and a refined prediction block (or refined bi-lateral template) derived based on a refined motion vector may be measured.

Specifically, when L0 reference block and L1 reference block are specified by L0 motion vector (MV0) and L1 motion vector (MV1) of a current block, an initial prediction block of the current block may be obtained by a weighted sum operation of the L0 reference block and the L1 reference block.

In addition, when refined L0 reference block and refined L1 reference block are specified by refined L0 motion vector (MV0') and refined L1 motion vector (MV1') of a search point, a refined prediction block may be obtained by a weighted sum operation of the refined L0 reference block and the refined L1 reference block.

When an initial prediction block and a refined prediction block are obtained, a cost of a search point may be calculated by calculating cost RD between the initial prediction block and the refined prediction block.

Figure 21:
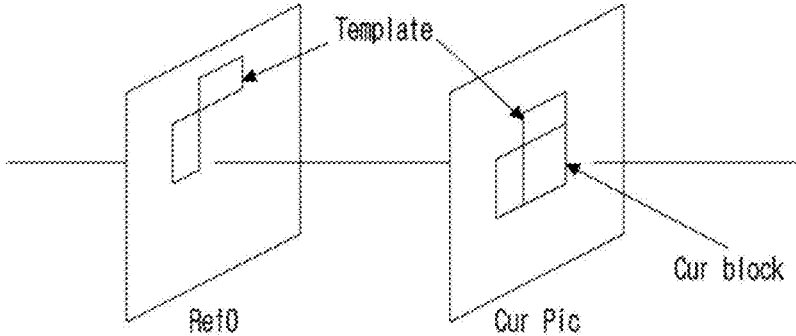
FIG. 21 is a diagram for describing an example of measuring a cost of a search point when a refinement mode is template matching.

FIG. 21 is a diagram for describing an example of measuring a cost of a search point when a refinement mode is template matching.

When a refinement mode of a current block is template matching, RD cost between a template (i.e., neighboring template) neighboring the current block and a template (i.e., refined neighboring template) neighboring a refined prediction block derived based on a refined motion vector may be measured.

A neighboring template may include at least one of a top region or a left region neighboring a current block, and a refined neighboring template may include at least one of a top region or a left region neighboring a refined block. Here, the top region or the left region be a region including a block of a predetermined size or a predetermined number of lines (rows or columns). A size or shape of a template may be variably determined based on at least one of a size, shape, motion vector, or output order difference between a current picture and a reference picture of a current block.

When a neighboring template and a refined neighboring template are determined, a cost of a search point may be calculated by measuring RD cost between the neighboring template and the refined neighboring template.

For another example, template matching may be performed by searching for a region most similar to a neighboring template of a current block within a search region of a reference picture. When a region most similar to the neighboring template of the current block in a predetermined region is searched for, a distance between a block neighboring the searched region and the current block may be set as a refined motion vector. For example, when the neighboring template is a region neighboring the top of the current block or a region neighboring the left of the current block, a distance between a block neighboring a bottom or right of a region having the lowest cost with the neighboring template in the search region and the current block may be set as a refined motion vector.

A refinement mode of a current block may be determined based on at least one of a size, shape, inter prediction mode, whether a bidirectional prediction is applied, motion vector size, or availability of a neighboring block of the current block. For example, when an initial motion vector of a current block is unidirectional, template matching may be selected as a refinement mode of the current block. On the other hand, when an initial motion vector of a current block is bidirectional, bi-lateral matching may be selected as a refinement mode of the current block.

Alternatively, information specifying a refinement mode may be signaled through a bitstream.

Alternatively, whether to signal the information may be determined based on at least one of a size, shape, inter prediction mode, whether a bidirectional prediction is applied, motion vector size, or availability of a neighboring block of a current block. For example, when an initial motion vector of a current block is bidirectional, the information may be signaled, whereas when an initial motion vector of the current block is unidirectional, a predefined refinement mode may be selected without signaling the information.

An encoder and a decoder may repeatedly perform steps S1430 and S1440 for all search points specified by a search pattern (S1450 and S1460). When a search point is unavailable, the unavailable search point may be replaced with an available search point, or the steps S1430 and S1440 may not be performed for the unavailable search point. For example, when a search point is outside a picture, that search point may be determined as being unavailable.

Thereafter, a refined motion vector of a search point having a lowest cost among a plurality of search points may be determined as a motion vector of a current block (S1470). That is, an initial motion vector of a current block may be updated with a refined motion vector of a search point having a lowest cost. When a motion vector of a current block is updated, motion compensation may be performed based on the updated motion vector.

In FIG. 14, a method for updating a motion vector of a current block at a search point has been described. DMCR may also be performed in the same manner as described with reference to FIG. 14. Specifically, after determining a refinement mode and a search pattern for each merge candidate, a refined motion vector for a search point is derived based on a motion vector of each merge candidate, and a cost of the search point may be calculated based on the derived refined motion vector. Thereafter, a refined motion vector of a search point having a lowest cost among a plurality of search points may be determined as a motion vector of a merge candidate.

A refinement mode and/or search pattern may be set the same for all merge candidates, or a merge candidate may have a different refinement mode and/or search pattern than other merge candidate.

In addition to a merge candidate, a motion vector candidate may be updated under AMVP mode. That is, a motion vector of a spatial neighboring block and/or a temporal neighboring block of a current block may be updated, and a motion vector candidate may be derived based on the updated motion vector. In the above-described example, it has been described that it is unnecessary to signal information on a difference value of a motion vector value before and after an update, since a decoder updates a motion vector in the same manner as an encoder.

For another example, in order to update a motion vector of a current block, information on an update may be encoded and signaled through a bitstream. Here, the information on the update may include at least one of information indicating a search point having a lowest cost (e.g., an index or a position of a search point) or information indicating a difference value of a motion vector before and after an update.

In FIG. 14, a motion vector of a current block is updated according to a predetermined order. However, the present invention is not limited to the order shown in FIG. 14. For example, an embodiment in which a part of the order shown in FIG. 14 is omitted or a part of the order is changed may be included in the scope of the present invention. For example, an embodiment of omitting at least one of the refinement mode selection step S1410 and the search pattern selection step S1420 or an embodiment of changing the order thereof may be included in the scope of the present invention.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed is:

1. A method of decoding a video, the method comprising:
obtaining a motion vector of a current block based on one of a plurality of inter modes pre-defined in a decoding apparatus, the inter modes including a motion vector prediction mode and a merge mode; and
obtaining a prediction block of the current block based on the motion vector of the current block; and
reconstructing the current block based on the prediction block of the current block,
wherein, under the motion vector prediction mode, the motion vector of the current block is obtained by adding a motion vector difference to one of a plurality of motion vector predictors,
wherein, under the merge mode, obtaining the motion vector of the current block comprises:

obtaining an initial motion vector of the current block based on a merge candidate selected from a plurality of merge candidates;
determining whether to refine the initial motion vector of the current block or not;
when it is determined to refine the initial motion vector, obtaining a difference vector for refining the initial motion vector of the current block; and
obtaining a refined motion vector of the current block by adding the difference vector to the initial motion vector,
wherein the merge candidate is selected from the plurality of merge candidates based on first index information parsed from a bitstream, the first index information indicating an index of the merge candidate,
wherein the difference vector is determined based on a difference value candidate selected from a plurality of difference value candidates,
wherein the difference value candidate is selected, from the plurality of difference value candidates, based on second index information parsed from the bitstream, the second index information indicating an index of the difference value candidate,
wherein the plurality of difference value candidates are pre-defined in the decoding apparatus, and
wherein refining the initial motion vector based on the difference value candidate is allowed only for the merge mode, but is not allowed for the motion vector prediction mode.

2. The method according to claim 1, wherein the method further comprises:
decoding candidate set information from the bitstream,
wherein, based on the candidate set information, one of a first candidate set or a second candidate set is selected, and
wherein the difference value candidate is selected from the plurality of difference vector candidates included in the selected one of the first candidate set or the second candidate set.

3. A method of encoding a video, the method comprising:
obtaining a motion vector of a current block based on one of a plurality of inter modes pre-defined in an encoding apparatus, the inter modes including a motion vector prediction mode and a merge mode;
obtaining a prediction block of the current block based on the motion vector; and
obtaining a residual block of the current block by subtracting the prediction block from an original block,
wherein, under the motion vector prediction mode, a motion vector difference representing a difference between the motion vector and a motion vector predictor is encoded into a bitstream,
wherein, under the merge mode, obtaining the motion vector of the current block comprises:
obtaining an initial motion vector of the current block;
obtaining a difference vector for refining the initial motion vector of the current block; and
obtaining a refined motion vector of the current block by adding a difference vector to the initial motion vector,
wherein first index information is encoded, into the bitstream, to indicate an index of one of a plurality of merge candidates, the initial motion vector of the current block being determined based on the one of the plurality of merge candidates, wherein second index information is encoded, into the bitstream, to indicate an index of one of a plurality of difference value candidates for determining the difference vector, wherein the plurality of difference vector candidates are pre-defined in the encoding apparatus, and wherein refining the initial motion vector based on the difference value candidate is allowed only for the merge mode, but is not allowed for the motion vector prediction mode.

4. The method according to claim 3, wherein the plurality of difference value candidates are included in one of a first candidate set or a second candidate set, and wherein candidate set information, indicating one of the first candidate set or the second candidate set, is encoded into the bitstream.

5. A device storing compressed video data which being generated with instructions, when the instructions being executed, a processor included in the device being configured to:

obtaining a motion vector of a current block based on one of a plurality of inter modes pre-defined in an encoding apparatus, the inter modes including a motion vector prediction mode and a merge mode;

obtaining a prediction block of the current block based on the motion vector; and obtaining a residual block of the current block by subtracting the prediction block from an original block, wherein, under the motion vector prediction mode, a motion vector difference representing a difference between the motion vector and a motion vector predictor is encoded into a bitstream, wherein, under the merge mode, obtaining the motion vector of the current block comprises:

obtaining an initial motion vector of the current block;

obtaining a difference vector for refining the initial motion vector of the current block; and obtaining a refined motion vector of the current block by adding a difference vector to the initial motion vector, wherein first index information is encoded, into the bitstream, to indicate an index of one of a plurality of merge candidates, the initial motion vector of the current block being determined based on the one of the plurality of merge candidates, wherein second index information is encoded, into the bitstream, to indicate an index of one of a plurality of difference value candidates for determining the difference vector, wherein the plurality of difference vector candidates are pre-defined in the encoding apparatus, and wherein refining the initial motion vector based on the difference value candidate is allowed only for the merge mode, but is not allowed for the motion vector prediction mode.

* * * * *